United States Patent [19]

Meyer

[11] Patent Number: 4,965,567
[45] Date of Patent: Oct. 23, 1990

[54] METHOD OF, AND APPARATUS FOR, TRANSMITTING DATA IN A MANUFACTURING MACHINE COMPRISING A PLURALITY OF PRODUCTION STATIONS

[75] Inventor: Urs Meyer, Niederglatt, Switzerland

[73] Assignee: Rieter Machine Works Limited, Winterthur, Switzerland

[21] Appl. No.: 288,179

[22] Filed: Dec. 22, 1988

[30] Foreign Application Priority Data

Dec. 24, 1987 [DE] Fed. Rep. of Germany ....... 3744208

[51] Int. Cl.⁵ ..................... G05B 23/02; D01H 13/18
[52] U.S. Cl. ................................. 340/825.16; 57/81; 340/310 R; 340/310 A; 370/85.1
[58] Field of Search ..................... 57/81, 87; 340/677, 340/310 R, 310 A, 825.16, 825.06, 825.07, 870.11; 28/227; 19/0.25, 0.26; 370/85

[56] References Cited

U.S. PATENT DOCUMENTS

| | | | |
|---|---|---|---|
| 3,696,383 | 10/1972 | Oishi et al. | 340/310 A X |
| 3,818,466 | 6/1974 | Honda | 340/310 R |
| 4,060,965 | 12/1977 | Schwartz | 57/81 X |
| 4,139,737 | 2/1979 | Shimada et al. | 340/310 A X |
| 4,185,272 | 1/1980 | Feiker | 340/310 R X |
| 4,294,066 | 10/1981 | Lane | 57/81 |
| 4,512,028 | 4/1985 | Stutz. | |
| 4,663,499 | 5/1987 | Duval. | |

FOREIGN PATENT DOCUMENTS

| | | |
|---|---|---|
| 0090766 | 10/1983 | European Pat. Off. . |
| 1134174 | 3/1985 | European Pat. Off. . |
| 1262331 | 3/1968 | Fed. Rep. of Germany . |
| 2313959 | 9/1973 | Fed. Rep. of Germany . |
| 2521388 | 11/1976 | Fed. Rep. of Germany . |
| 2731019 | 5/1978 | Fed. Rep. of Germany . |
| 3225106 | 4/1985 | Fed. Rep. of Germany . |
| 3631477 | 3/1988 | Fed. Rep. of Germany . |
| 479478 | 11/1969 | Switzerland . |
| 589979 | 7/1977 | Switzerland . |
| 2123589 | 2/1984 | United Kingdom . |

OTHER PUBLICATIONS

Madron, T. W., "Local Area Networks in Large Organizations", Hayden Book Company, 1984, pp. 9–12.

Primary Examiner—Ulysses Weldon
Attorney, Agent, or Firm—Werner W. Kleeman

[57] ABSTRACT

The method and apparatus for transmitting data are used in a manufacturing machine, particularly a yarn manufacturing machine containing a plurality of production stations, a plurality of associated monitoring locations, a plurality of respective monitoring sensors, and a central control unit. The central control unit applies to the monitoring locations a modulated supply voltage via a conductor common to all of the monitoring locations. The modulated supply voltage contains a plurality of sections each of which is associated with one of the plurality of monitoring locations. The associated section is identified at the monitoring location by counting from a starting point which is marked in the modulated supply voltage. At the occurrence of a predetermined event at respective ones of the plurality of monitoring locations, respective sections of the modulated supply voltage are marked. The marked sections as well as the respective monitoring locations are identified in the central control unit.

33 Claims, 3 Drawing Sheets

METHOD OF, AND APPARATUS FOR, TRANSMITTING DATA IN A MANUFACTURING MACHINE COMPRISING A PLURALITY OF PRODUCTION STATIONS

CROSS-REFERENCE TO RELATED APPLICATION

This application is related to the commonly assigned, co-pending U.S. application Ser. No. 07/288,267, filed Dec. 22, 1988, U.S. Pat. No. 4,922,702, entitled "STOPPING DEVICE FOR FIBER MATERIAL, SUCH AS A SLIVER, ROVING OR SLUBBING IN A TEXTILE MACHINE AND ENERGY STORAGE DEVICE". The disclosure of this application is incorporated herein by reference.

BACKGROUND OF THE INVENTION

The present invention relates to a new and improved method and apparatus for transmitting data in a manufacturing machine, especially a yarn or thread manufacturing machine.

In its more particular aspects, the present invention specifically relates to a new and improved method and apparatus for transmitting data in a manufacturing machine, especially a yarn or thread manufacturing machine containing a plurality of production stations, a plurality of associated monitoring locations, a plurality of respective monitoring sensors, and a central control unit communicating with the plurality of monitoring locations.

In a known method or circuit arrangement for transmitting data in a textile machine of the aforementioned type such as known, for example, from European Patent Publication No. 0,090,766, published Oct. 5, 1983, and the cognate U.S. Pat. No. 4,512,028, granted Apr. 16, 1985, an electronic scanner is utilized for monitoring a multitude of production stations or thread running locations in the textile machine. For this purpose, each production station or thread running location is provided with a monitoring location in the form of a measuring head for detecting thread rupture or breakage. The output signals of the measuring heads are supplied, via a signal line and by means of an interrogation or scanning operation, to a central unit which constitutes an indicating or control device. This known circuit arrangement is distinguished by the fact that each measuring head is associated with a bistable controller having a data input and a clock input. The bistable controllers are series connected by means of their data inputs and the clock inputs are connected to a common clock pulse generator.

Due to the series connection of the bistable controllers there exists the disadvantage that a failure in one of the bistable controllers will result in failure of the entire circuit arrangement. This is a very significant disadvantage considering that the textile machine frequently contains more than 1000 production stations or thread running locations and the risk of failure is always existent at one of such a great number of production stations or thread running locations. Also, the known circuit arrangement results in a wiring layout and expense which may be relatively small in comparison to other known circuit arrangements but still is undesirably high.

A specific prior art thread break detector is described in Swiss Patent No. 479,478, granted Oct. 15, 1969. In an improved thread breakage or rupture sensor such as known, for example, from German Patent No. 2,313,959, granted Mar. 31, 1977, the output signal of the thread breakage or rupture sensor is evaluated in an evaluation circuit. The output signal of the evaluation circuit triggers an alarm or control device for automatically stopping or shutting down the thread delivery or supply. Such an evaluation circuit is provided for each thread breakage or rupture sensor, however, it is not explained in the aforementioned German patent in which manner the individual alarm signals present at the output terminals of such evaluation circuits are transmitted to a central control unit.

In a known apparatus for monitoring an operating sequence of production stations of a textile machine with respect to thread breakage or rupture such as known, for example, from German Patent No. 2,731,019, granted Nov. 9, 1978, there is disclosed the possibility of passing a sensor head for receiving electrical signals in a contactless manner, past the production stations on a guide rail. A traction band for the sensor head is constructed as a metallic, electrically conductive traction band which provides electrical connection between the sensor head and a central control unit.

It is generally desired and significantly important for all manufacturing machines containing a plurality of production stations of the same type that a predetermined state or condition or event can be detected at individual ones of the plurality of production stations, the production or manufacturing operation at such individual production stations can be adapted to such predetermined state or condition or event, and data related to such predetermined state or condition or event at all of the plurality of production stations ultimately can be transmitted to a central evaluation or control unit. In, for example, a ring spinning machine containing a plurality of spinning stations, a thread breakage or rupture sensor is present at each one of the plurality of spinning stations and detects whether the respective spinning station produces yarn or thread in a normal spinning operation.

An electronic amplifier transforms the signal produced by the thread breakage or rupture sensor into a suitable electrical triggering signal for a slubbing stopping device which is associated with the respective spinning location. The slubbing stopping device, in turn, effects an interruption in the slubbing supply as soon as the normal operation of the spinning station is disturbed. The information "spinning station disturbed" is communicated to the central evaluation or control unit via a signal line. The central evaluation or control unit, in turn, informs the operator about the number and location of the thus detected disturbed spinning stations and generates statistical data with respect to the course of the entire manufacturing operation.

It should be emphasized at this point that in all hitherto known solutions found for these problems in textile machines, there was required a considerable electrical wiring layout and expense in order to ensure the electrical power supply for the thread breakage or rupture sensor, the electronic evaluation circuits and the triggering operation at each one of the plurality of production stations as well as to transmit data from the various stations to the central evaluation or control unit. The prior art circuit arrangements rely upon separately providing the electrical power supply and the data transmission.

Various other methods or procedures are also known in the art for combining the data related to the individual production stations in groups and transmitting the entire group of data in coded form via a single pair of lines or conductors. Corresponding coding methods are known and standardized to a substantial extent by utilizing, for example, serial interfaces such as the serial interface RS 232. However, such coding operation is associated with considerable electronic effort and expense and is, in any event, prohibitively high for utilization at each individual production station.

SUMMARY OF THE INVENTION

Therefore with the foregoing in mind it is a primary object of the present invention to provide a new and improved method and apparatus for transmitting data in a manufacturing machine and which method and apparatus rely upon a simple electrically operating data transmission circuit arrangement at considerably reduced wiring layout and electronic hardware and expense, and which method and apparatus can be utilized in combination with a great number of manufacturing machines containing a plurality of production stations which have to be monitored.

Another significant object of the present invention is directed to a new and improved method and apparatus for transmitting data in a manufacturing machine and which method and apparatus operates in a manner such that failure of a component at one individual monitoring location does not result in a breakdown of the entire data transmission system.

Still a further important object of the present invention is directed to providing a new and improved method and apparatus for transmitting data in a manufacturing machine and which method and apparatus, in addition to providing the required data transmission, permit supplying the energy or power required for actuating operating means which are provided at the individual production stations.

It is a further noteworthy object of the present invention to provide a new and improved method and apparatus for transmitting data in a manufacturing machine containing a plurality of production stations and which method and apparatus, despite their respective simplicity of operation and construction, are nonetheless highly reliable in operation, not readily subject to breakdown or malfunction and require a minimum of maintenance and servicing.

Now in order to implement these and still further objects of the invention, which will become more readily apparent as the description proceeds, the data transmission method of the present development is manifested, among other things, by the features that, the central control unit applies a modulated supply voltage to the plurality of monitoring locations via conductor means which are common to all of the plurality of monitoring locations. The modulated supply voltage contains a plurality of sections each of which is associated with one of the plurality of monitoring locations and is identified at such monitoring locations by counting from a marked starting point in the modulated supply voltage. At the occurrence of a predetermined event at respective monitoring sensors, the sections of the modulated supply voltage which are associated with the respective monitoring locations are marked and such markings as well as the respective monitoring locations are identified by the central control unit.

When using the inventive method, all of the plurality of monitoring locations can be and preferably are connected in parallel to each other to the central control unit which delivers the modulated supply voltage. This modulated supply voltage serves for supplying power to the individual monitoring locations but also contains a plurality or temporal sequence of sections each of which is associated with an individual one of the plurality of monitoring locations.

Each individual one of the plurality of monitoring locations as such determines by means of a counting process which section time interval of the modulated supply voltage is specifically associated with such individual monitoring location. At the occurrence of a predetermined event like, for example, a thread breakage or rupture in a yarn or thread manufacturing machine at a respective monitoring location, this monitoring location can correspondingly mark the associated section or time interval of the modulated supply voltage, i.e. alter or modulate the voltage variation within such associated section or time interval. Such marking is identified or recognized by the central control unit. At the moment of time at which the aforementioned marking arrives, the central control unit also is capable of determining the monitoring location from which the marking originated.

The inventive method or course of operation does not require any particular coding operation so that there is also not required a multitude of interfaces. Since the plurality of monitoring locations are connected in parallel to each other to the central control unit, failure of one monitoring location will not result in a breakdown of the entire data transmission. Furthermore, since the common conductor means leading to all of the plurality of monitoring locations, can also be used for simultaneously supplying electrical energy or power to the monitoring locations and which energy, if desired, can be stored therein, there is only required a minimum layout and expense for wiring. The reason therefore is that only a two-wire conductor is required and each monitoring location must be connected thereto merely by means of two terminals.

As alluded to above, the invention is not only concerned with the aforementioned method aspects, but also relates to a new and improved construction of apparatus or circuit arrangement for carrying out the same. Generally speaking, the inventive apparatus for transmitting data in a manufacturing machine, especially a yarn or thread manufacturing machine contains a plurality of production stations, a plurality of associated monitoring locations, a plurality of respective monitoring sensors, and a central control unit communicating wtih the monitoring locations.

To achieve the aforementioned measures, the inventive apparatus, in its more specific aspects, comprises:

A two-wire conductor or conductor means for applying to the individual monitoring locations a modulated supply voltage containing a regularly recurring modulation;

each one of the plurality of monitoring locations is connected to the two-wire conductor;

the modulated supply voltage comprises a plurality of consecutive substantially identical half-waves or sections each of which is associated with one of the plurality of monitoring locations;

each one of the plurality of monitoring locations contain counting means for identifying the associated half-wave or section of the plurality of consecutive substantially identical half-waves or sections of the modulated supply voltage;

marking means provided at each one of the plurality of monitoring locations containing the respective monitoring sensors for detecting the occurrence of a predetermined event at each one of the plurality of monitoring locations;

the marking means, at the occurrence of the predetermined event, marking the half-wave or section of the plurality of consecutive substantially identical half-waves or sections of the modulated supply voltage and which half-wave or section is associated with the monitoring location at which the respective monitoring sensor has detected the occurrence of the predetermined event;

an identifying circuit in the central control unit for identifying the markings of the marked sections as well as the individual monitoring locations associated with the individual markings or marked sections.

Preferably, the identifying circuit contained in the central control unit for associating the individual markings or marked sections with the individual monitoring locations, also comprises a counting device. This constitutes a simple measure for carrying out the required association in the central control unit so that also in this respect the circuit layout and expense is relatively small.

A particularly preferred construction of the inventive apparatus is distinguished by the fact that the modulated supply voltage containing the plurality of consecutive substantially identical half-waves or sections comprises a regularly recurring modulation and regularly spaced synchronization markings. Such synchronization markings render possible, with relatively small electronic complexity, maintaining synchronization of the counting means present at the individual monitoring locations.

The counting means associated with the respective monitoring locations are advantageously reset at each arrival of a synchronization marking. This results in the specific advantage that the counting capacity of the individual counting means only must be dimensioned such as to correspond to the total number of production stations present in the manufacturing machine. The synchronization markings are reliably generated by means of a time or clock pulse generator producing an output signal which is directly or indirectly additionally applied to the counting device which is associated with the identifying circuit in the central control unit. There is thus established trouble-free synchronization also in this respect.

A particularly preferred construction of the inventive apparatus or circuit arrangement is distinguished by the fact that each monitoring location is supplied with electrical energy or power which, if desired, is stored in a storage circuit which may contain a capacitor.

In a particularly advantageous further development of the inventive apparatus, an electrically powered operating means or device is associated with each one of the plurality of production stations. When the manufacturing machine, for example, constitutes a yarn or thread manufacturing machine, such electrically operating means may comprise, for example, a slubbing stopping device.

The modulated supply voltage which is supplied to the individual monitoring locations associated with the individual production stations via the two-wire conductor, thus is used without any additional effort and expense for serving a further electrical purpose, namely supplying energy or power to the electrically powered operating means or device. In this manner, there is also saved in this respect, a considerable wiring layout and expense.

Preferably, there is provided in the central control unit, means for generating and transmitting signals for blocking the aforementioned electrically powered operating means at the individual monitoring locations. Such construction is based on the recognition that it is important in the various manufacturing machines to disable the provided electrically powered operating means, for example, during start-up of such manufacturing machines or, in the specific example of yarn or thread manufacturing machines, to block the slubbing stopping device, for instance, during a change in the spinning material and restarting of the spinning operation.

In a simple construction, the means for generating and transmitting the signals for blocking the electrically powered operating means can be constructed such as to effect a general change in the level of the modulated supply voltage and which voltage level change can be recognized at the individual monitoring locations associated with the individual production stations.

In a further advantageous development of the inventive apparatus, the output signal of each one of the plurality of monitoring sensors effects triggering of the associated electrically powered operating means when the predetermined event is detected by such monitoring sensor. In other words, the electrically powered operating means is directly triggered at the respective monitoring location which is associated with a selected production station. The corresponding triggering signal thus is not required to be supplied or delivered by the central control unit. Such mode of operation, however, would be basically possible because the data required therefore likewise could be contained, in the inventive apparatus or circuit arrangement, in the modulated supply voltage, specifically in the section thereof which is associated with the monitoring location of the selected production station.

The identifying circuit in the inventive apparatus or circuit arrangement comprises an interface, particularly a serial interface of the designation RS 232, by means of which the central control unit can be connected to a microcomputer or microprocessor so that the manufacturing machine can be integrated into the entirety of the production installation or the monitoring system monitoring such production installation. Such interface may also serve for coupling to an alarm device or alarm indicator. However, a microcomputer can be incorporated in the central control unit.

In a particularly preferred construction of the inventive apparatus, the modulated supply voltage constitutes a rectified AC voltage which is not smoothed or only insubstantially smoothed and wherein each one of the aforementioned plurality of sections constitutes a half-wave of the rectified AC voltage. The utilization of a rectified AC voltage is particularly advantageous because such rectified AC voltage can be generated in a simple manner from the local mains or power line. Usually the frequency of the mains or power line is very stable and thus presents a precise basis for temporally associating the individual half-waves or sections of the modulated supply voltage with the individual monitoring locations and production stations.

In such circuit arrangement, marking of the half-wave or section which is associated with one of the plurality of monitoring locations, preferably is effected by means of a capacitor which is charged transiently or for a brief period of time by closing switch means using the output signal of the associated monitoring sensor. There is thus caused a voltage drop or gap within the associated half-wave or section and such voltage drop or gap is recognized by the identifying circuit present at the central control unit.

It will be evident from the foregoing explanations that the inventive method and apparatus are distinguished, among others, by essentially two significant considerations, namely:

(i) Effecting the voltage supply to the individual ones of the plurality of monitoring locations and the related electrically powered operating means by using a common two-wire conductor which simultaneously is utilized for data transmission;

(ii) taking over the objective of synchronizing the serially transmitted data by the supply voltage, particularly by means of the wave-like character of the supply voltage and which wave-like character originates from the mains frequency.

The realization of the aforementioned two inventive considerations results in a decisive saving with respect to the components as well as the wiring layout and expense.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENTS

Describing now the drawings, it is to be understood that to simplify the showing thereof, only enough of the construction of the data transmitting apparatus has been illustrated therein as is needed to enable one skilled in the art to readily understand the underlying principles and concepts of this invention. Turning attention now specifically to FIG. 1 of the drawings, the inventive apparatus illustrated therein by way of example and not limitation will be understood to be used in conjunction with a manufacturing machine constituting, for instance, a yarn or thread manufacturing machine, specifically a yarn or thread spinning machine which especially may be constructed as a ring spinning machine. However, it should be noted that the inventive apparatus or circuit arrangement which is illustrated by the block circuit diagram of FIG. 1 of the drawings, likewise can be employed in combination with various other types of manufacturing machines which, like the textile machine in the illustrated example, comprise a plurality of production stations and associated monitoring locations connected with a central control unit for monitoring the operation of the individual production stations. Therefore, any reference in the following description to yarn or thread manufacturing machines and, specifically, yarn or thread spinning machines is to be understood to merely refer to a specific example for the type of combination in which the inventive apparatus or circuit arrangement can be employed but does not limit the use of the inventive apparatus or circuit arrangement to the specifically described exemplary embodiment.

Figure 1:
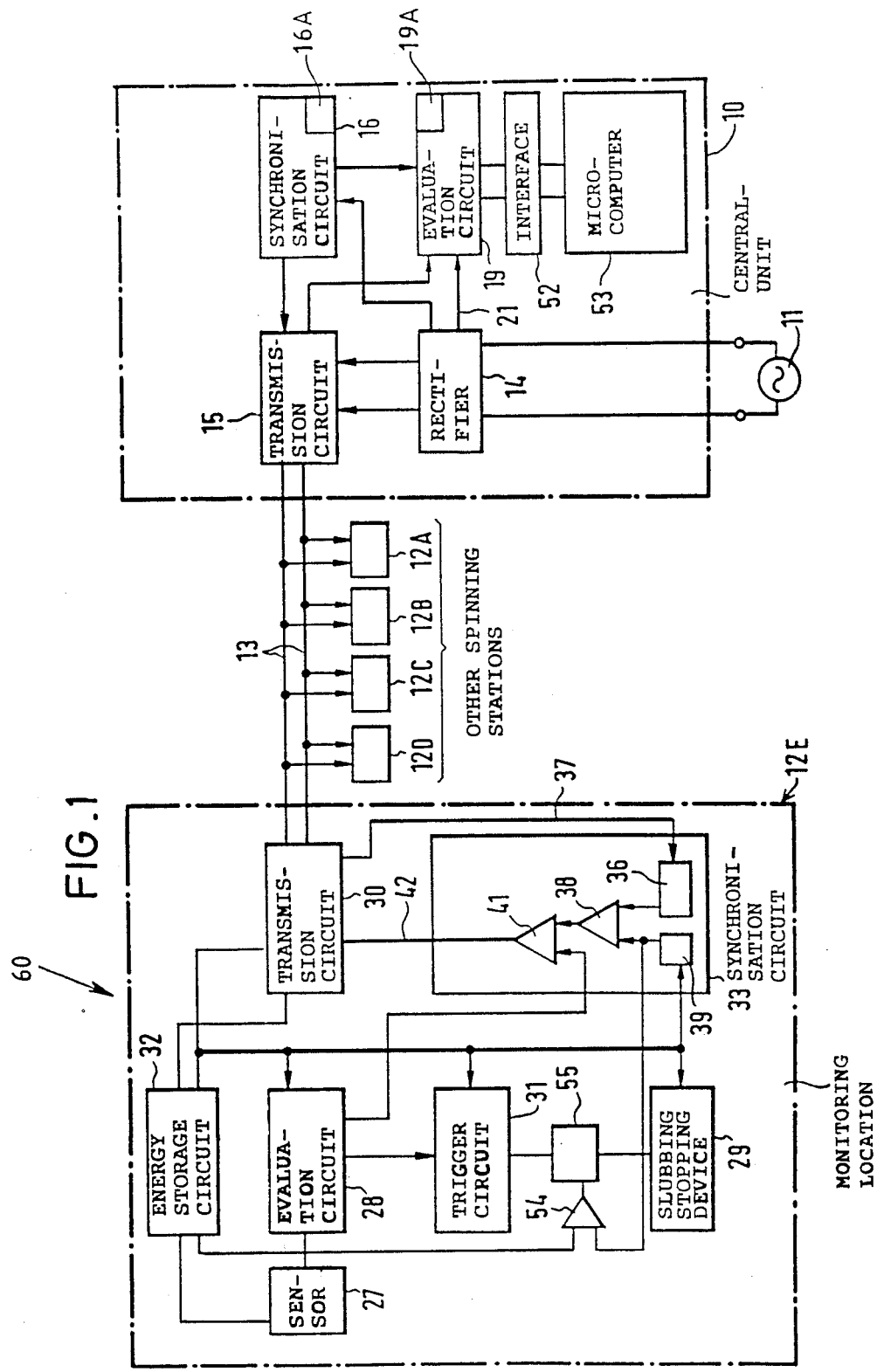
FIG. 1 is a block circuit diagram showing a first exemplary embodiment of the inventive apparatus or circuit arrangement which has been especially conceived for use with a ring spinning machine.

More specifically, the manufacturing machine such as the specifically illustrated example of the yarn or thread manufacturing machine of the block circuit diagram of FIG. 1, will be seen to comprise a plurality of production stations 12A through 12E such as a plurality of spinning stations in the specifically illustrated yarn or thread manufacturing machine, a plurality of monitoring locations 60 each of which is associated with a respective one of the plurality of production stations 12A through 12E, a plurality of respective monitoring sensors 27 each of which is associated with one of the plurality of monitoring locations 60 and each of which constitutes a thread breakage or rupture sensor in the specifically illustrated yarn or thread manufacturing machine, and a central unit or central control unit 10 which is in communication with the plurality of monitoring locations 60.

In the block circuit diagram of FIG. 1 of the drawings, the central unit or central control unit 10 is connected to the mains or power line 11. Such central unit or central control unit 10 is connected to the plurality of substantially identically constructed production stations 12A through 12E and the plurality of associated monitoring locations 60 through common conductor means 13 constituting a two-wire conductor. In the specifically illustrated example of a ring spinning machine, such production stations 12A through 12E constitute spinning locations. While merely five such spinning locations are conveniently shown in FIG. 1, the number of such spinning locations, however, is much higher in practice and may amount to, for example, 1,000 spinning locations. In fact, the inventive apparatus or circuit arrangement can be employed in combination with any desired number of production stations such as the spinning stations of the specifically illustrated example.

Figure 2:
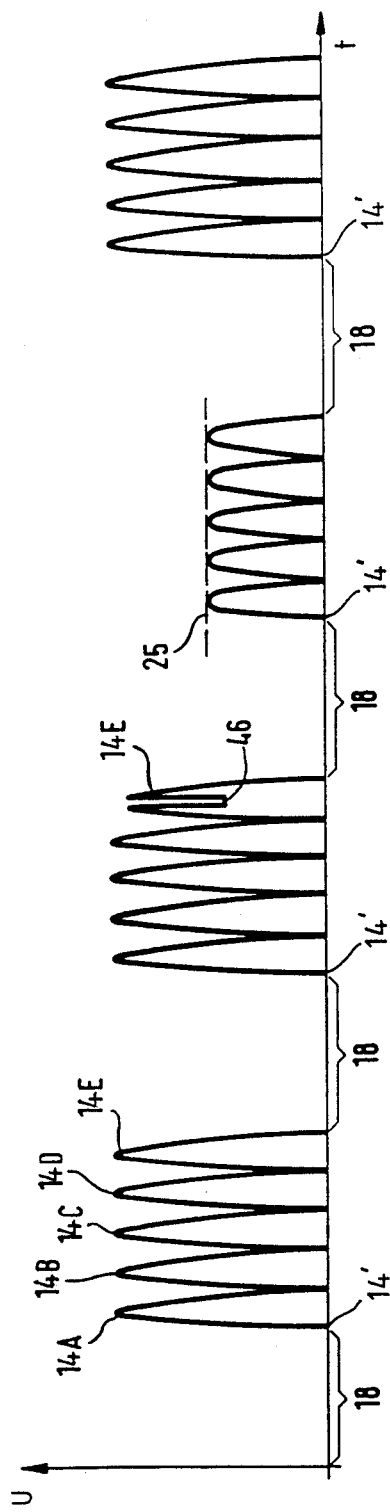
FIG. 2 is a graph illustrating the temporal variation of the modulated supply voltage used in the apparatus or circuit arrangement as shown in FIG. 1.

The mains or power line voltage which is received by the central unit or central control unit 10, is first applied to a rectifier 14 which produces a rectified output voltage having the wave form as illustrated in FIG. 2, however, still without the synchronization gap designated by the reference character 18 in such FIG. 2. The illustrated wave form comprises a predeterminate number or plurality of consecutive substantially identical half-waves or sections 14A through 14E each of which is associated with one of the plurality of monitoring locations 60 associated with respective ones of the plurality of production stations 12A through 12E in a manner as will be described further hereinbelow. The rectified output voltage constitutes a modulated supply voltage which is supplied to a transmission circuit 15 and to a synchronization circuit 16, which essentially comprises a time or clock pulse generator 16A, in the central unit or central control unit 10.

The time or clock pulse generator 16A which receives the modulated supply voltage from the rectifier 14, delivers regularly spaced time or clock pulse signals to the transmission circuit 15. This time or clock pulse generator 16A of the synchronization circuit 16 further is constructed such as to generate, after throughpassage of the predeterminate number or plurality of half-waves or sections 14A through 14E and which number corresponds to the number of production stations 12A through 12E, an output signal having a duration corresponding to a preselected number, in the illustrated example, four of the aforementioned half-waves or sections which are produced by the rectifier 14.

Figure 3:
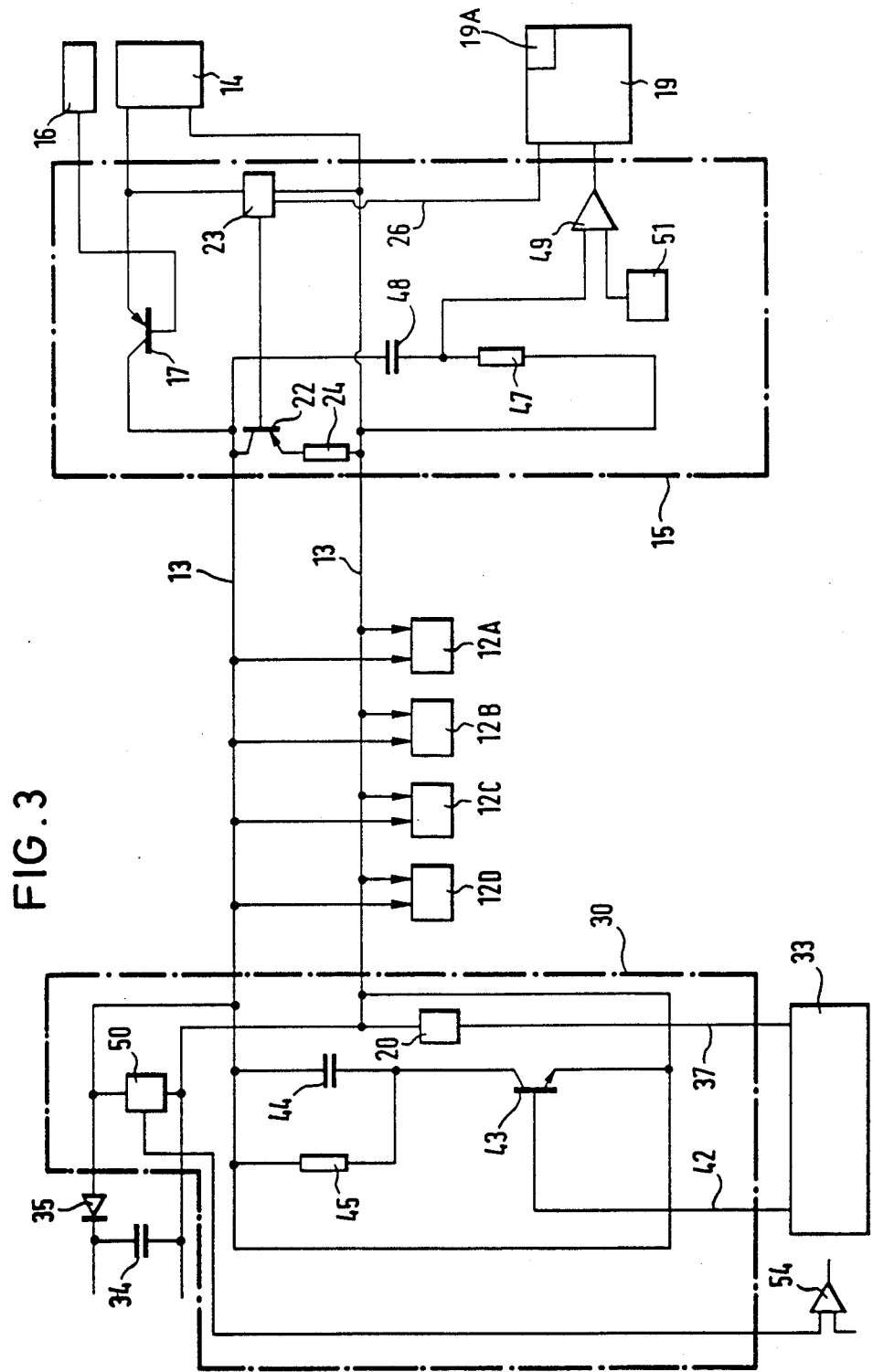
FIG. 3 shows further details with respect to transmission circuits used in the apparatus or circuit arrangement illustrated in FIG. 1.

This output signal of four half-waves duration is fed to the base of a transistor switch 17 which is shown in FIG. 3 as a component of the transmission circuit 15 and connects the rectifier 14 to the common conductor means or two-wire conductor 13. This transistor switch 17 normally is in the conductive state or condition and applies the half-waves or sections of the modulated supply voltage to the common conductor means or two-wire conductor 13. In the presence of the aforementioned output signal generated by the time or clock pulse signal generator 16A of the synchronization circuit 16, the transistor switch 17 is rendered non-conductive and, as a result, there is produced the synchronization gap 18 as illustrated in FIG. 2. Such synchronization gap 18 exists for a duration which is determined by the duration o±the aforementioned output signal, i.e. for the duration of the aforementioned four half-waves or sections of the rectified output voltage or modulated supply voltage produced by the rectifier 14. Consequently, as illustrated in FIG. 2, the modulated supply voltage which is applied to the common conductor means or two-wire conductor 13, comprises the plurality of consecutive substantially identical half-waves or sections 14A through 14E which actually are applied in groups separated by regularly spaced synchronization markings constituted by the synchronization gaps 18. Each plurality of half-waves or sections will be seen, from the showing of FIG. 2, to start at a predetermined starting point 14'.

The time or clock pulse signal generated by the synchronization circuit 16 is simultaneously applied to an evaluation circuit 19 of the central unit or central control unit 10. The evaluation circuit 19 contains a counting device 19A which is reset at the occurrence of each aforementioned output signal or synchronization gap 18 and restarted thereafter. The counting device 19A thus counts each one of the half-waves or sections 14A through 14E in each group of the rectified output voltage or modulated supply voltage, which is produced by the rectifier 14 and received by the evaluation circuit 19 via the line or conductor 21, between the synchronization gaps 18.

As will be further evident from FIG. 3, the transmission circuit 15 of the central unit or central control unit 10 contains, for a purpose described further hereinbelow, a second or further transistor 22 having a base which is connected to a switch 23. Such switch 23 can be actuated by the operator serving the manufacturing machine such as the specifically illustrated yarn or thread manufacturing machine but may also be connected by the line or conductor 26 to the evaluation circuit 19. The switch 23 thus is enabled to be actuated not only by the operator but, if desired, additionally may be actuated from a central operating desk or console or a computer. The switch 23 is connected and powered by the rectifier 14.

The second or further transistor 22 normally is in the non-conductive state or condition and is controlled by the switch 23 in a manner such as to be rendered conductive when the switch 23 is actuated. As a result, current is flowing through a resistor 24 and the transistor 22 between the two wires of the common conductor means or two-wire conductor 13 and a change is effected in the voltage level of the modulated supply voltage which is applied to the common conductor means or two-wire conductor 13. In the specifically illustrated example, the voltage level is lowered as indicated at 25 in FIG. 2 of the drawings. The voltage level of the modulated supply voltage is returned to its original level by re-opening the switch 23, whereby the second or further transistor 22 is returned into its non-conductive state or condition.

The modulated supply voltage which is applied to the common conductor means or two-wire conductor 13 and which has the wave form as illustrated in FIG. 2, is simultaneously received at all of the plurality of monitoring locations 60 associated with the production stations 12A through 12E such as the specifically illustrated spinning stations. For this purpose, each one of the plurality of monitoring locations 60 contains a transmission circuit 30. The essential constituents of such transmission circuit 30 are illustrated in FIG. 3.

It will be evident from FIG. 1 that each one of the plurality of monitoring locations 60 associated with the production stations 12A through 12E such as the specifically illustrated spinning stations, comprises the transmission circuit 30 which is connected to the common conductor means or two-wire conductor 13, the monitoring sensor 27 such as a thread breakage or rupture sensor in the specifically illustrated example, an evaluation circuit 28 for evaluating the output signal generated by the monitoring sensor 27, an electrically powered operating means 29 for carrying out a predetermined operation, such as a slubbing stopping device in the specifically illustrated example, a trigger circuit 31 for triggering the electrically powered operating means 29, an electric energy or power storage circuit 32 for storing the electric energy or power required for operating the monitoring sensor 27, the trigger circuit 31 and the electrically powered operating means 29, as well as a synchronization circuit 33.

The electrical energy or power storage circuit 32, as illustrated in FIG. 3, contains a capacitor 34 which is connected between the two wires of the common conductor means or two-wire conductor 13. This electrical energy, or power storage circuit 32 further comprises a rectifier in the form of a diode 35 which ensures that the electrical energy or power stored in the capacitor 34 cannot flow back into the common conductor means or two-wire conductor 13.

The monitoring sensor 27 such as the specifically illustrated thread breakage or rupture sensor as well as the evaluation circuit 28 connected thereto may have any desired construction. For example, the monitoring sensor 27 may constitute a light barrier producing an output signal which is transformed into a rectangular switching pulse by means of the evaluation circuit 28. Alternatively, the monitoring sensor 27 and the associated evaluation circuit 28, in the specifically illustrated example of a yarn or thread manufacturing machine, may be constructed in correspondence with the thread breakage or rupture detector described in the aforementioned German Patent No. 2,313,959. A multitude of possibilities are available for constructing the aforementioned two components and such possibilities are well known in the art.

The aforementioned trigger circuit 31 for triggering the electrically powered operating means 29 and the electrically powered operating means 29 likewise are known in the art as such. In the specifically illustrated example of the yarn or thread manufacturing machine, the trigger circuit 31 and the electrically powered operating means 29 such as the specifically illustrated slubbing stopping device preferably are constructed in the manner of the stopping device for fiber material, such as a sliver, roving or slubbing in a textile machine, and which stopping device is described in the afore-noted copending and commonly assigned cross-referenced application.

In this specific construction, the slubbing stopping device is operated under the action of gravity. A mechanical or actuating member or element of the slubbing stopping device, is normally held in an inoperative position by means of a permanent magnet. The permanent magnet normally is held at or attracted to the core of an electromagnet and, by supplying energy or power to the electromagnet, there is effected a displacement of the magnetic field lines within the core of the electromagnet. As a result, the attraction of the permanent magnet at this core of the electromagnet is eliminated and the permanent magnet is repelled from the core. Gravity, then, effects the actuation of the slubbing stopping device.

In other known constructions, the slubbing stopping device is actuated under the action of a spring force which becomes effective when the force is removed by means of which the permanent magnet is connected to the electromagnet.

The aforementioned energy storage circuit 32 supplies the energy or power required for the electromagnet which is a component of the electrically powered operating means 29 such as the specifically illustrated slubbing stopping device. The supply of the energy or power to the electromagnet is controlled by the trigger circuit 31 in response to a control signal which is generated by the evaluation circuit 28.

The monitoring sensor 27 and the electrically powered operating means 29 such as the specifically illustrated slubbing stopping device, operate independent of the synchronization of the inventive apparatus or circuit arrangement and which synchronization is provided by the synchronization circuit 16 at the central unit or central control unit 10 and the synchronization circuit 33 provided at each one of the plurality of monitoring locations 60 associated with the production stations 12A through 12E such as the specifically illustrated spinning stations. However, it is important that the occurrence of a predetermined event, which is sensed by the monitoring means 27, such as a thread breakage or rupture in the specifically illustrated example of a yarn or thread manufacturing machine, is communicated to the central unit or central control unit 10. This communication is effected through the transmission circuits 30 and 15. For this purpose, each one of the plurality of monitoring locations 60 associated with the production stations 12A through 12E, contains counting means 36 which are connected to the transmission circuit 30 via a line or conductor 37. A synchronization gap detector 20 is connected in circuit therewith for detecting the synchronization gap 18 in the modulated supply signal. The counting means 36 are reset at each appearance of a synchronization gap 18 and then are restarted from zero to count the individual half-waves or sections 14A through 14E of the modulated supply voltage.

The output signal of the counting means 36 is applied to a first comparator 38 which receives a further input signal from means for generating an adjustable reference number or an adjustable number generator 39. Such adjustable number generator 39 generates a number which corresponds to the respective production station such as the specifically illustrated spinning station. The first comparator 38 delivers an output signal only if the counting means 36 and the adjustable number generator 39 have counted the same number.

The output signal of the first comparator 38 is applied to a second comparator 41 which also receives the output signal of the evaluation circuit 28. At the instant at which both these signals are present at the second comparator 41, there is produced an output signal at the second comparator 41 and this output signal appears at the moment at which the associated half-wave or section of the modulated supply voltage arrives at the respective monitoring location 60.

The output signal of the second comparator 41 is applied via a line or conductor 42, see FIG. 3, to marking means 43,44 constituted by switch means 43 and a capacitor 44. The switch means 43, in the illustrated example, are formed by a transistor and the output signal of the second comparator 41 is applied to the base of such transistor. The switch means 43 are connected with the capacitor 44 which, for instance, has 0.01 $\mu$F and is connected between the two wires of the common conductor means or two-wire conductor 13. A resistor 45 of 10 kOhm is connected parallel to the capacitor 44 in order to ensure that the capacitor 44 is discharged during its inoperative state or condition, i.e. in the absence of an output signal at the second comparator 41.

As explained hereinbefore, the output signal is present at the second comparator 41 only when an output signal is generated by the first comparator 38. Such output signal is generated when the number produced by the adjustable number generator 39 is equal to the count counted by the counting means 36, i.e. during the time period during which the proper half-wave or section of the modulated supply voltage is present at the monitoring location 60. As a consequence, the switch means 43 is transiently closed, i.e. the third transistor is transiently rendered conductive so that the capacitor 44 is charged during the time of the transient closure of the switch means 43. This has the result that the common conductor means or two-wire conductor 13 is, so to speak, short-circuited for the duration of a few microseconds. There is thus produced, in the associated half-wave or section of the modulated supply voltage, a voltage drop or gap 46 defining a marking or marking pulse as illustrated in FIG. 2.

This voltage drop or gap 46 is detected by the transmission circuit 15 in the central unit or central control unit 10. Since this voltage drop or gap 46 is only produced at the occurrence of the predetermined event to which the respective monitoring sensor 27 responds, and due to the association of the respective half-wave or section in the modulated supply signal with the respective monitoring location 60, such voltage drop or gap 46 constitutes a marking pulse marking the respective half-wave or section of the modulated supply voltage. Such marking permits identifying the monitoring location 60 and the respective production station at which the predetermined event has occurred, i.e. in the specifically illustrated example of a yarn or thread manufacturing machine the spinning station at which the thread breakage or rupture is sensed or detected.

FIG. 3 also illustrates the construction of the transmission circuit 15 in the central unit or central control unit 10. The evaluation of the short marking pulses 46 constituted by the voltage drops or gaps 46 and impressed upon respective half-waves or sections of the modulated supply voltage upon the response of the respective monitoring sensor 27, is effected by this transmission circuit 15 through an identifying circuit containing elements 47, 48, 49 and the evaluation circuit 19. This identifying circuit 19, 47, 48, 49 taps-off the voltage present on the common conductor means or two-wire conductor 13. Specifically, the elements 47, 48, 49 are here constituted by a high-pass filter which contains the combination of a resistor 47 and a capacitor 48, and a comparator 49. A typical high-pass filter is constructed from a resistor 47 having a resistance of 1 kOhm and a capacitor 48 having a capacitance of 0.01 $\mu$F.

The identifying circuit 47, 48, 49 produces at the junction between the resistor 47 and the capacitor 48, an output signal representative of the marking pulse or voltage drop or gap 46 which appears in the half-wave or section of the modulated supply signal at the occurrence of the predetermined event to which the monitoring sensor 27 has responded at the respective monitoring location 60.

This output signal is applied in conventional manner to the comparator 49 of the identifying circuit 47, 48, 49 and this comparator 49 also receives a reference signal from a reference signal generator 51. As a result, the comparator 49 produces a well-defined rectangular pulse which is suitable for further processing by means of digital processing techniques and fed to the evaluation circuit 19 in the central unit or central control unit 10.

The well-defined rectangular pulse outputted by the comparator 49 as well as the related time or clock pulse signal originating from the synchronization circuit 16 are supplied to a microcomputer or microprocessor 53 of the or associated with the central unit or central control unit 10 through a serial interface 52, if desired, after further digital processing. In this manner, the microcomputer 53 is enabled to communicate and indicate the disturbance related to the predetermined event and detected by the monitoring sensor 27. Also, the microcomputer 53 is programmed in such a manner as to produce a statistical evaluation of the occurrences of the predetermined event in the manufacturing machine such as the thread breakage or rupture in the specifically illustrated example of a yarn or thread manufacturing machine.

As already mentioned hereinbefore, the electrically powered operating means 29 such as the specifically illustrated slubbing stopping device, can be blocked or disabled if such blockage is desired by the operator or for any other reasons. Such blockage is effected by lowering the voltage level of the modulated supply voltage which is applied to the common conductor means or two-wire conductor 13. For this purpose, there are provided, in the transmission circuit 15 of the central unit or central control unit 10, the transistor 22, the resistor 24 and the actuatable switch 23 which, when actuated, renders the transistor 22 conductive. The transistor 22, the switch 23 and the resistor 24 thus conjointly constitute means 22, 23, 24 for generating the aforementioned voltage level decrease as a blocking signal for blocking the operation of the electrically powered operating means 29 such as the specifically illustrated slubbing stopping device.

In order to detect the presence of the aforementioned blocking signal, there is provided, in the transmission circuit 30 of each one of the plurality of monitoring locations 60 which are associated with the plurality of production stations 12A through 12E such as the specifically illustrated spinning stations, an electrical threshold value sensor 50. The output signal generated by this electrical threshold value sensor 50 and the output signal of the aforementioned adjustable number generator 39 present at this monitoring location 60 are applied to a further comparator 54. The output of this further comparator 54 is connected to an electronic switch 55 such that the output signal outputted by the further comparator 54 controls the electronic switch 55. In the presence of such output signal, the current supply to the electrically operated operating means 29 such as the specifically illustrated slubbing stopping device is interrupted.

This specific construction of the inventive apparatus or circuit arrangement has the advantage that the blockage of the electrically powered operating means 29 such as the specifically illustrated slubbing stopping device, can be effected by manually closing the switch 23 as well as by electronic closure of a corresponding electronic switch by means of the microcomputer or microprocessor 53. In the first case of the manually operated switch 23, all of the plurality of production stations 12A through 12E such as the specifically illustrated spinning stations, are simultaneously blocked, whereas in the second case of the microcomputer-controlled electronic switch, the blockage can be effected selectively or in preselected groups of such production stations 12A through 12E.

The mode of operation of the inventive apparatus or circuit arrangement described hereinbefore is as follows:

The rectifier 14 generates the rectified, insubstantially smoothed rectified voltage constituting the modulated supply voltage which is illustrated in FIG. 2 and which is applied through the common conductor means or two-wire conductor 13 to all of the plurality of monitoring locations 60 each of which is associated with one of the plurality of production stations 12A through 12E such as the specifically illustrated spinning stations. Each one of the plurality of consecutive substantially identical half-waves or sections 14A through 14E is associated with one of the plurality of monitoring locations 60 and thereby with a respective one of the plurality of production stations 12A through 12E.

The presence of the modulated supply voltage at the common conductor means or two-wire conductors 13, charges the capacitors 34 of the energy or power storage circuits 32 at the individual monitoring locations 60 which are associated with the respective half-waves or sections of the modulated supply voltage. The thus stored electrical energy or power is provided for operating the individual aforementioned circuit components present at the monitoring locations 60.

The synchronization gaps 18 which are evident from FIG. 2, are generated by the synchronization circuit 16 at the central unit or central control unit 10. Each such synchronization gap 18 causes, at its time of appearance, the counting means 36 to be reset at the individual monitoring locations 60.

Upon the occurrence of a predetermined event at a respective production station such as a thread breakage or rupture in the specifically illustrated example of the yarn or thread manufacturing machine, a monitoring signal is produced by the respective monitoring sensor 27 such as the specifically illustrated thread breakage or rupture sensor and converted into a corresponding control signal by the evaluation circuit 28 at the respective monitoring location 60. Such control signal serves for triggering the associated electrically powered operating means 29 such as the specifically illustrated slubbing stopping device 29 via the trigger circuit 31. Simultaneously, the control signal is used for generating the marking pulse or voltage drop or gap 46 in the respective half-wave or section of the modulated supply voltage and which half-wave or section is associated with the monitoring location 60 at the respective one of the production stations 12A through 12E such as the specifically illustrated spinning stations.

In the illustrated example, the marking pulse 46 is constituted by a short voltage drop or gap and is generated by charging the capacitor 44. As described hereinbefore, synchronization of the marking pulse 46 with the respective half-wave or section of the modulated supply voltage is ensured by the presence of the counting means 36, the comparators 38 and 41 as well as the adjustable number generator 39.

The marking pulse or voltage drop or gap 46 in the respective half-wave or section of the modulated supply voltage is identified at the central unit or central control unit 10 through the transmission circuit 15 by means of the identifying circuit 47, 48, 49 constituted by the high-pass filter containing the resistor 47 and the capacitor 48 and the comparator 49. A signal representative of the marking pulse 46 is further passed to the microcomputer 53 conjointly with the respective time or clock pulse signal. The microcomputer 53 indicates the occurrence of the predetermined event such as the thread breakage or rupture in the specifically illustrated example and, if desired, produces a statistical evaluation with respect to the occurrences of the predetermined event such as the thread breakages or ruptures in the specifically illustrated embodiment as well as with respect to the time required for removing the failure.

If, for example, due to a change in the manufacturing process, it would be desired to block the triggering of individual ones of the electrically powered operating means 29 such as the specifically illustrated slubbing stopping devices, the voltage level of the respective half-waves or sections of the modulated supply voltage and which half-waves or sections are associated with the respective individual monitoring locations 60 and respective individual ones of the plurality of production stations 12A through 12E such as the spinning stations of the illustrated example, is lowered using the blocking signal generating means 22, 23, 24. Such lowering of the voltage level is identified at the respective individual monitoring locations 60 by means of the respective threshold value sensors 50 and synchronization circuits 33 in the respective transmission circuits 30. As a consequence, corresponding control signals are applied to the respective electronic switch 55, which may be a transistor, so that electrical power cannot be applied to the respective electrically powered operating means 29 such as the specifically illustrated slubbing stopping devices.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. A method of transmitting data in a manufacturing machine, particularly yarn manufacturing machine, containing a plurality of production stations, a plurality of monitoring sensors located at respective monitoring locations of respective ones of said plurality of production stations, and a central control unit communicating with said plurality of production stations, said method comprising the steps of:

presetting a predetermined starting point at the central control unit for starting data transmission between the central control unit and the plurality of production stations;

generating at the central control unit a modulated supply voltage comprising a plurality of consecutive sections starting from said predetermined starting point;

applying said plurality of consecutive sections of said modulated supply voltage from said central control unit to common conductor means to which all of the plurality of production stations are connected in parallel, and thereby applying said plurality of consecutive sections of said modulated supply voltage to all of the production stations;

counting, from the starting point preset by said central control unit, the number of said plurality of consecutive sections of said modulated supply voltage at each one of said plurality of production stations and at said central control unit in order to thereby synchronize said central control unit and said plurality of production stations;

generating respective reference numbers at each one of said plurality of production stations;

comparing said respective reference numbers and said number of said plurality of consecutive sections of said modulated supply voltage counted at each one of said plurality of production stations and allocating said plurality of consecutive sections of said modulated supply voltage to respective ones of said plurality of production stations having a reference number equal to the counted number of consecutive sections of said modulated supply voltage;

detecting the occurrence of a predetermined event at related ones of said plurality of monitoring sensors located at respective monitoring locations of associated ones of said plurality of production stations;

generating through said related monitoring sensors at said associated production stations, respective markings indicative of the occurrence of said predetermined event in the allocated sections of the modulated supply voltage during the time such allocated sections are applied to said associated production stations and thereby producing marked sections of said plurality of consecutive sections of said modulated supply voltage;

sensing said markings of said marked sections at said central control unit via said common conductor means; and identifying, at said central control unit and as a result of counting the number of said plurality of consecutive sections of said modulated supply voltage in said central control unit, said marked sections in said plurality of consecutive sections of said modulated supply voltage and thereby identifying said associated production stations at which said predetermined event has been detected.

2. The method as defined in claim 1, further including the step of:
supplying by means of the modulated supply voltage electrical power to said plurality of production stations, via said common conductor means which are common to all of said plurality of production stations.

3. The method as defined in claim 1, further including the step of:
storing said electrical power supplied via said common conductor means, in each one of said plurality of production stations.

4. The method as defined in claim 1, wherein:
said step of generating said plurality of consecutive sections of said modulated supply voltage entails rectifying an AC voltage and thereby producing a plurality of half-waves constituting said plurality of consecutive sections of said modulated supply voltage.

5. The method as defined in claim 1, wherein:
said steps of generating said plurality of consecutive sections of said modulated supply voltage and applying said plurality of consecutive sections of said modulated supply voltage to said common conductor means, entails generating and applying to said common conductor means separate groups each containing said consecutive sections of said modulated supply voltage in a number equal to the number of said plurality of production stations.

6. The method as defined in claim 5, wherein:
after applying to said common conductor means each one of said groups containing said predetermined number of consecutive sections of said modulated supply voltage, interrupting the application of said consecutive sections of said modulated supply voltage to said common conductor means for a preselected duration of a synchronization gap;
during said synchronization gap, resetting counting means at each one of said plurality of production stations and a counting device at said central control unit; and
selecting, as said preset starting point, the end of said synchronization gap for applying a further group containing said predetermined number of consecutive sections of said modulated supply voltage to said common conductor means and for simultaneously restarting said counting means in said plurality of production stations and said counting device in said central control unit.

7. The method as defined in claim 6, wherein:
said step of interrupting the application of said predetermined number of consecutive sections of said modulated supply voltage to said common conductor means entails disconnecting said common conductor means from a source of said plurality of consecutive sections of said modulated supply voltage for said preselected duration of said synchronization gap.

8. The method as defined in claim 1, wherein:
said step of generating said respective markings upon detecting said predetermined even at the associated production stations and in case of correspondence of said reference numbers generated at said associated production stations and the numbers of the allocated sections of said plurality of consecutive sections of said modulated supply voltage counted at said associated production stations, entails the step of transiently connecting the common conductor means to a load for transiently decreasing the voltage of the allocated section of said plurality of consecutive sections of said modulated supply voltage at each one of said associated production stations.

9. The method as defined in claim 1, wherein:
said step of identifying said marked section in said plurality of said consecutive sections of said modulated supply voltage entails applying said consecutive sections of said modulated supply voltage to a high-pass filter for filtering the transiently appearing marking from said marked sections; and
comparing the filtered marking with a predetermined reference signal and generating, under the control of said counting device in said central control unit, an output signal indicative of the production station associated with said marked section.

10. The method as defined in claim 1, further including the step of:
upon detecting said predetermined event in the presence of said reference number at the associated production station, powering electrically powered operating means and triggering an actuation member of said electrically powered operating means for carrying out a predetermined operation in response to said predetermined event detected by the respective monitoring sensor.

11. The method as defined in claim 10, wherein:
said step of detecting said predetermined event entails detecting a thread rupture at a respective spinning station of a plurality of spinning stations constituting said plurality of production stations; and
said step of triggering said actuation member entailing the step of triggering an actuation member of a slubbing stopping device.

12. The method as defined in claim 10, further including the steps of:
decreasing the voltage of a predeterminate number of said plurality of consecutive sections of said modulated supply voltage applied to said common conductor means;
detecting a voltage decrease at respective ones of said plurality of production stations to which said predeterminate number of sections are allocated; and
upon detecting said voltage decrease, blocking the steps of powering said electrically powered operating means and triggering said actuation member for carrying out said predetermined operation at said respective production stations.

13. An apparatus for transmitting data in a manufacturing machine, especially yarn manufacturing machine, containing a plurality of production stations, a plurality of monitoring sensors located at respective monitoring locations of respective ones of said plurality of production stations, and a central control unit communicating with said plurality of production stations, said apparatus comprising:
common conductor means interconnecting said central control unit and a parallel connected plurality of production stations;
said central control unit containing generating means for generating a modulated supply voltage containing a plurality of consecutive sections;
said generating means of said central control unit being connected to said common conductor means for applying said plurality of consecutive sections of said modulated supply voltage to said common conductor means and thereby to all individual ones of the plurality of production stations;

counting means connected to said common conductor means and provided in each one of said plurality of production stations for counting the number of said plurality of consecutive sections of said modulated supply voltage at each one of said plurality of production stations;

a counting device provided in said central control unit for counting, in synchronism with said counting means at said plurality of production stations, the number of said plurality of consecutive sections of said modulated supply voltage applied to said common conductor means;

a synchronization circuit provided in said central control unit and connected to said common conductor means and said counting device for setting a predetermined starting point for applying said plurality of consecutive sections of said modulated supply voltage to said common conductor means and for simultaneously starting a counting operation at said counting device in said central control unit and said counting means in each one of said plurality of production stations in order to thereby synchronize said central control unit and said plurality of production stations;

a reference number generator provided at each one of said plurality of production stations for generating a reference number specific for a respective one of said plurality of production stations;

comparator means provided at each one of said plurality of production stations and connected to the counting means and the reference number generator for comparing the reference number and the number of said plurality of consecutive sections of the modulated supply voltage counted by said counting means and for allocating said consecutive sections of said modulated supply voltage to respective ones of said plurality of production stations having a reference number which corresponds to the number of consecutive sections of said modulated supply voltage counted by the respective ones of said counting means;

marking means provided at each one of said plurality of production stations and connected to said monitoring sensors and said comparator means;

said marking means being connected to said common conductor means and being controlled by said monitoring sensor and said comparator means for producing a marking in the allocated section of the modulated supply voltage during the time such allocated section is applied to the respective production station and at the occurrence of a predetermined event detected by the monitoring sensor at the respective production station;

detection means provided in said central control unit for detecting said markings in said plurality of consecutive sections of said modulated supply voltage; and an identifying circuit provided in said central control unit and connected to said counting device and said detection means for identifying markings in said plurality of consecutive sections of said modulated supply voltage and thereby the production stations at which said predetermined event has been detected.

14. The apparatus as defined in claim 13, wherein:
said common conductor means comprising a two-wire conductor; and
said plurality of production stations being connected to said two-wire conductor in parallel to each other.

15. The apparatus as defined in claim 13, wherein:
said counting device is contained in said identifying circuit and connected to said synchronization circuit for associating said markings in said plurality of consecutive sections of said modulated supply voltage with the respective production stations at which said predetermined event has been detected.

16. The apparatus as defined in claim 13, wherein:
said synchronization circuit generating regularly spaced groups each of which contains said plurality of consecutive sections of said modulated supply voltage and which are regularly spaced by synchronization gaps of predetermined duration; and
each of said groups containing said plurality of consecutive sections of said modulated supply voltage in a number which is equal to that of said plurality of production stations.

17. The apparatus as defined in claim 16, wherein:
said counting means provided in each one of said plurality of production stations, are reset by each one of said synchronization gaps generated by said synchronization circuit.

18. The apparatus as defined in claim 16, wherein:
said synchronization circuit contains a clock pulse generator connected to said common conductor means for generating said regularly spaced synchronization gaps; and
said clock pulse generator being connected to said counting device in said identifying circuit of said central control unit.

19. The apparatus as defined in claim 13, wherein:
said central control unit supplies by means of the modulated supply voltage electrical power via said common conductor means to each one of said plurality of production stations.

20. The apparatus as defined in claim 19, further including:
storage means provided at each one of said plurality of production stations and connected to said common conductor means, for storing said electrical power applied by said central control unit to said plurality of production stations through said common conductor means.

21. The apparatus as defined in claim 20, wherein:
said storage means contain a capacitor.

22. The apparatus as defined in claim 19, further including:
electrically powered operating means including an actuating member for carrying out a predetermined operation and provided at each one of said plurality of production stations;
said electrically powered operating means connected to the monitoring sensor at each one of said plurality of production stations for carrying out said predetermined operation in response to an output signal produced by said monitoring sensor upon the occurrence of said predetermined event at the associated production station; and
said actuating member of said electrically powered operating means being triggered by said electrically powered operating means in order to carry out said predetermined operation in response to said output signal produced by said monitoring sensor.

23. The apparatus as defined in claim 22, wherein:
each one of said plurality of production stations constitutes a yarn production station of a yarn manufacturing machine; and
said electrically powered operating means constitutes a slubbing stopping device containing said actuating member.

24. The apparatus as defined in claim 22, further including:
means for generating a blocking signal for blocking the operation of said electrically powered operating means in each one of said plurality of production stations;
said blocking signal generating means being connected in circuit with said central control unit and said common conductor means; and
said blocking signal generating means transmitting said blocking signal to said electrically powered operating means in predetermined ones of said plurality of production stations.

25. The apparatus as defined in claim 13, further including:
a microcomputer provided for said central control unit and connected to said identifying circuit of said central control unit; and
said identifying circuit and said microcomputer being interconnected through a preselected interface.

26. The apparatus as defined in claim 25, wherein:
said interface constitutes a serial RS 232 interface.

27. The apparatus as defined in claim 13, wherein:
said generating means of said central control unit for generating said plurality of consecutive sections of said modulated supply voltage, comprise a rectifier connected to an AC voltage source for rectifying an AC voltage thereof and producing a plurality of consecutive substantially identical half-waves constituting said plurality of consecutive sections of said modulated supply voltage.

28. The apparatus as defined in claim 24, wherein:
said means for generating said blocking signal for blocking the operation of the electrically powered operating means at each one of said plurality of production stations, effects a change in the voltage level of said modulated supply voltage generated by said central control unit.

29. The apparatus as defined in claim 23, wherein:
said plurality of monitoring sensors constitute thread breakage sensors.

30. An apparatus for transmitting data in a manufacturing machine, especially yarn manufacturing machine, containing a plurality of production stations, a plurality of monitoring sensors located at respective monitoring locations of respective ones of said plurality of production stations, and a central control unit communicating with said plurality of production stations, said apparatus comprising:
common conductor means interconnecting said central control unit and the plurality of production stations;
said central control unit generating a modulated supply voltage having a regularly recurring modulation and containing a plurality of consecutive substantially identical sections each of which is associated with one of said plurality of production stations;
said central control unit applying, via said common conductor means, said modulated supply voltage to all individual ones of the plurality of production stations;
counting means connected to said common conductor means and provided in each one of said plurality of production stations for identifying, in said plurality of consecutive substantially identical sections of said modulated supply voltage, the section which is associated with said individual production station;
each one of said plurality of production stations containing marking means connected to a respective one of said plurality of monitoring sensors and to said common conductor means;
said marking means being controlled by said counting means for marking the associated one of said plurality of consecutive substantially identical sections of said modulated supply voltage at the occurrence of a predetermined event detected by the respective monitoring sensor;
said central control unit detecting a marking of said marked section via said common conductor means;
said central control unit comprising an identifying circuit for identifying markings of the marked sections in said plurality of consecutive substantially identical sections and thereby the production stations associated with said marked sections;
said marking means provided at each one of said plurality of production stations, comprise a capacitor;
said marking means further including switch means for interconnecting said capacitor and said common conductor means;
said switch means being transiently closed under the action of an output signal generated by the respective monitoring sensor at the occurrence of said predetermined event;
said capacitor being charged during the time of said transient closure of said switch means whereby a voltage drop is produced in the associated one of said plurality of consecutive substantially identical sections of said modulated supply voltage and which section is associated with said monitoring location at which the respective monitoring sensor has responded to the occurrence of said predetermined event; and
said voltage drop constituting a marking of said associated section for identification of the respective production station by said identifying circuit in said central control unit.

31. The apparatus as defined in claim 30, further including:
a resistor connected in parallel with said capacitor in each one of said plurality of production stations; and
said resistor ensuring that said capacitor is discharged in the absence of said predetermined event.

32. An apparatus for transmitting data in a manufacturing machine, especially yarn manufacturing machine, containing a plurality of production stations, a plurality of monitoring sensors located at respective monitoring locations of respective ones of said plurality of production stations, and a central control unit communicating with said plurality of production stations, said apparatus comprising common conductor means interconnecting said central control unit and the plurality of production stations;

said central control unit generating a modulated supply voltage having a regularly recurring modulation and containing a plurality of consecutive substantially identical sections each of which is associated with one of said plurality of production stations;

said central control unit applying, via said common conductor means, said modulated supply voltage to all individual ones of the plurality of production stations;

counting means connected to said common conductor means and provided in each one of said plurality of production stations for identifying, in said plurality of consecutive substantially identical sections of said modulated supply voltage, the section which is associated with said individual production station;

each one of said plurality of production stations containing marking means connected to a respective one of said plurality of monitoring sensors and to said common conductor means;

said marking means being controlled by said counting means for marking the associated one of said plurality of consecutive substantially identical sections of said modulated supply voltage at the occurrence of a predetermined event detected by the respective monitoring sensor;

said central control unit detecting a marking of said marked section via said common conductor means;

said central control unit comprising an identifying circuit for identifying markings of the marked sections in said plurality of consecutive substantially identical sections and thereby the production stations associated with said marked sections;

a high-pass filter included in said identifying circuit of said central control unit;

said high-pass filter being connected to said common conductor means and generating an output signal representative of a marking pulse marking the section of said plurality of consecutive substantially identical sections of said modulated supply voltage and which section is associated with the monitoring location at which the respective monitoring sensor has responded to the occurrence of said predetermined event; and means for generating a well-defined rectangular pulse from said output signal representative of said marking pulse.

33. An apparatus for transmitting data in a manufacturing machine, especially yarn manufacturing machine, containing a plurality of production stations, a plurality of monitoring sensors located at respective monitoring locations of respective ones of said plurality of production stations, and a central control unit communicating with said plurality of production stations, said apparatus comprising:

common conductor means interconnecting said central control unit and the plurality of production stations;

said central control unit generating a modulated supply voltage having a regularly recurring modulation and containing a plurality of consecutive substantially identical sections each of which is associated with one of said plurality of production stations;

said central control unit applying, via said common conductor means, said modulated supply voltage to all individual ones of the plurality of production stations;

counting means connected to said common conductor means and provided in each one of said plurality of production stations for identifying, in said plurality of consecutive substantially identical sections of said modulated supply voltage, the section which is associated with said individual production station;

each one of said plurality of production stations containing marking means connected to a respective one of said plurality of monitoring sensors and to said common conductor means;

said marking means being controlled by said counting means for marking the associated one of said plurality of consecutive substantially identical sections of said modulated supply voltage at the occurrence of a predetermined event detected by the respective monitoring sensor;

said central control unit detecting a marking of said marked section via said common conductor means;

said central control unit comprising an identifying circuit for identifying markings of the marked sections in said plurality of consecutive substantially identical sections and thereby the production stations associated with said marked sections;

means for generating an adjustable reference number and contained in each one of said plurality of production stations;

a comparator connected on its input side to said means for generating said adjustable reference number and said counting means; and said comparator having an output connected in circuit with said marking means for marking the section of said plurality of consecutive substantially identical sections of said modulated supply voltage and which section is associated with the production station at which the respective monitoring sensor has responded to the occurrence of said predetermined event.

* * * * *